J. R. ALBERTSON.
Garden Hoe.
No. 27,675.                              Patented Apr. 3, 1860.
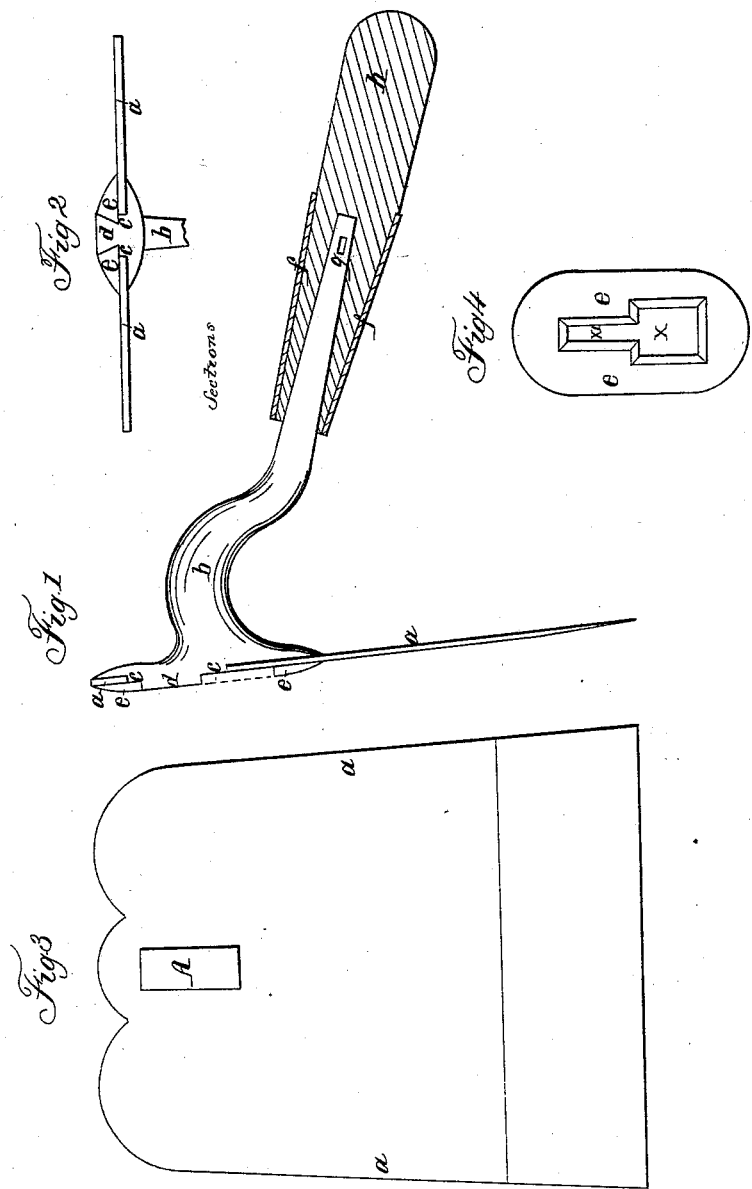

UNITED STATES PATENT OFFICE.

JOHN R. ALBERTSON, OF EAST DEER TOWNSHIP, ALLEGHENY COUNTY, PA.

IMPROVEMENT IN GARDEN-HOES.

Specification forming part of Letters Patent No. 27,675, dated April 3, 1860.

*To all whom it may concern:*

Be it known that I, JOHN R. ALBERTSON, of East Deer township, Allegheny county, Pennsylvania, have invented a new and Improved Garden-Hoe; and I do hereby declare that the following is a full and exact description thereof, reference being had to the accompanying drawings, and to the letters of reference marked thereon.

The nature of my invention consists in a mechanical arrangement for securing the blade to the handle of the hoe.

To enable others skilled in the art to make and use my invention, I will proceed to describe its construction and operation.

In the accompanying drawings, Figure 1 is a central section of the hoe lengthwise of the handle, shank, blade, and washer. Fig. 2 is a central section of the hoe crosswise of the shank, blade, and washer. Fig. 3 is a face view of the blade. Fig. 4 is a face view of the washer.

$a$ is the blade. $b$ is the shank. $c$ is a shoulder. $d$ is a dovetail. $e$ is the washer. $f$ is a ferrule. $h$ is the handle. A is the eye in the blade. The washer $e$ has a large opening, X, and small opening X'. The small opening is made to correspond to the dovetail $d$. The shank is secured in the handle by means of a pin passing through the opening $g$ in the shank.

The operation of my improvement is as follows: The opening A of the blade is placed over the shoulder $c$ of the shank $b$. The large opening X of the washer is then placed over the dovetail and then shoved down, so as to secure the blade to the shank of the handle. The whole, when properly arranged, will appear as represented in Figs. 1 and 2.

Having thus described the nature, construction, and operation of my invention, what I claim as of my invention, and desire to secure by Letters Patent of the United States, is—

Shank $b$, shoulder $c$, dovetail $d$, washer $e$, blade $a$, with the opening A, the whole being constructed and arranged as and for the purposes set forth.

JOHN R. ALBERTSON.

Witnesses:
JAMES J. JOHNSTON,
GEORGE P. STECK.